United States Patent

Week

[15] 3,692,156
[45] Sept. 19, 1972

[54] PARKING BRAKE RELEASED BY TRANSMISSION CONTROL PRESSURES

[72] Inventor: Nils Peder Week, Allen Park, Mich.

[73] Assignee: General Motors Corporation, Detroit, Mich.

[22] Filed: Oct. 12, 1971

[21] Appl. No.: 188,020

[52] U.S. Cl. .................. 192/4 A, 303/13, 137/625.4, 137/625.6, 91/419
[51] Int. Cl. ............................................. B60k 29/02
[58] Field of Search ........................ 192/4 A, 4 R, 4 C

[56] References Cited

UNITED STATES PATENTS

| 2,725,129 | 11/1955 | Martin | 192/4 A |
| 3,136,399 | 6/1964 | Granryd | 192/4 A |
| 3,365,036 | 1/1968 | Forrester | 192/4 A |

*Primary Examiner*—Benjamin W. Wyche
*Attorney*—W. E. Finken et al.

[57] ABSTRACT

A vehicle parking brake release control mechanism is hydraulically actuated to release the parking brake. The mechanism is actuated by transmission line pressure and is controlled by the admission of the highest of transmission governor pressure or forward or reverse pressures to a control valve which controls the admission and exhaust of line pressure from the hydraulic release servomotor. The release servomotor is de-energized when there is insufficient governor or forward or reverse pressure to actuate it. When the servomotor is energized the brakes may be modulatingly applied through the parking brake control mechanism to stop the vehicle.

2 Claims, 2 Drawing Figures

PATENTED SEP 19 1972

3,692,156

INVENTOR.
Nils Peder Week
BY
D. D. McGraw
ATTORNEY

PARKING BRAKE RELEASED BY TRANSMISSION CONTROL PRESSURES

The invention relates to a vehicle hydraulic release parking brake mechanism and more particularly to one which is powered by automatic transmission line pressure and is actuated through a valve assembly controlling the admission of transmission line pressure to the hydraulic release servomotor when the transmission is producing an operational mode pressure such that the parking brake should be released. The valve assembly is in turn controlled by the admission of another automatic transmission produced operational mode pressure which, when such pressure is produced, causes the release servomotor to be energized and the parking brake mechanism to be released. Such operational mode pressures include the governor pressure; a forward drive pressure, or if there are more than one such forward drive modes each of the forward drive pressures, and the reverse pressure. The mechanism includes a preference valve arrangement so that the highest of the governor and transmission operational mode pressures is available to be transmitted to the control valve assembly to cause release of the parking brake mechanism. When there is no pressure sufficiently high to actuate the valve assembly, such as when the vehicle is stopped and is in neutral or park, the release servomotor is de-actuated.

IN THE DRAWING

Figure 1:
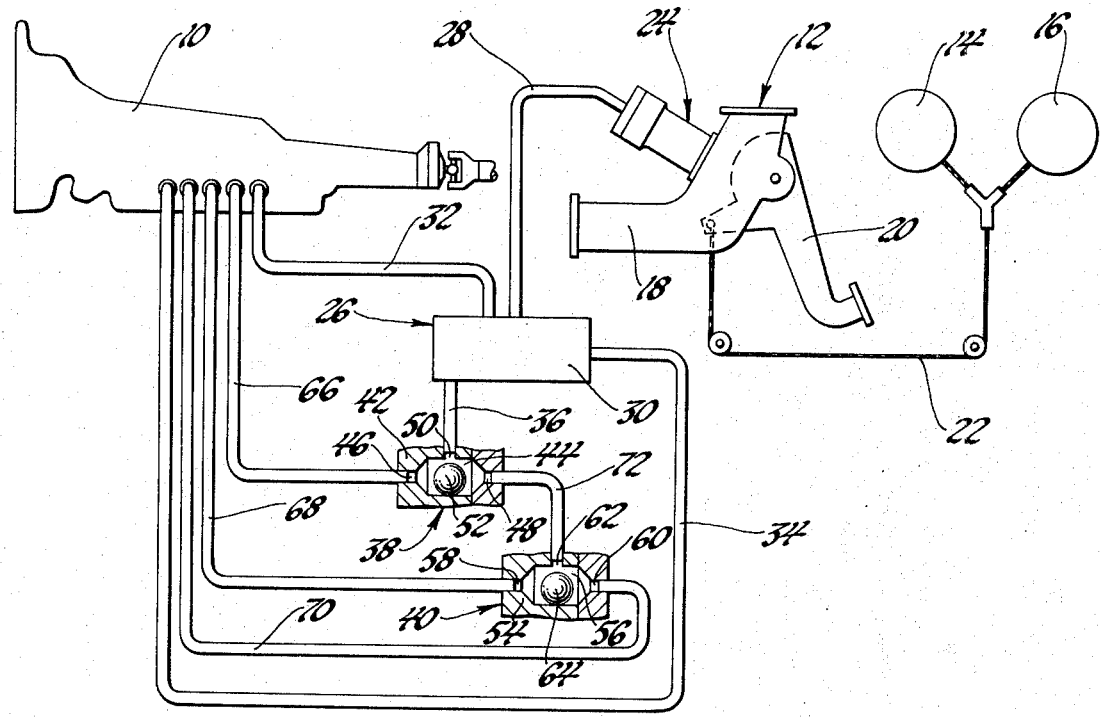
FIG. 1 is a schematic illustration, with parts broken away and in section, showing a mechanism installed in a vehicle and embodying the invention.

The vehicle in which the system is installed is provided with an automatic transmission 10, a parking brake mechanism 12, and a pair of wheel brakes 14 and 16. Typically the brakes which provide parking brake operation are the rear brakes of the vehicle. However, the brakes may be associated with another part of the drive line or with the front wheels of the vehicle if such is desired. The parking brake mechanism is somewhat schematically illustrated as including a mounting bracket 18 suitably secured to the vehicle so that the brake pedal arm 20 is pivoted to it in an appropriate manner to be operated by the vehicle operator. The brake pedal arm is suitably attached to a parking brake tensioning cable 22 which is routed to operate the parking brakes which form a part of the vehicle wheel brakes 14 and 16.

A hydraulically powered parking brake release servomotor 24 is suitably mounted so that when it is actuated by extensible movement of the push rod in a manner to be described in greater detail, the parking brake arm 20 is released and permitted to return to the released parking brake position.

A valve assembly 26 has a conduit 28 interconnecting the valve housing 30 and the release servomotor 24. Transmission line pressure from automatic transmission 10 is connected by conduit 32 to the valve housing 30. The conduit 34 is an exhaust conduit which functions as a hydraulic fluid return line leading to the transmission sump. Conduit 36 is connected to the valve assembly housing 30 and is also connected to a preference valve arrangement which is described in greater detail below. The preference valve arrangement is schematically illustrated as including two valve assemblies 38 and 40. Valve assembly 38 has a housing 42 in which is formed a chamber 44 having two inlet ports 46 and 48 and an outlet port 50. A ball check 52 is located in chamber 44 and is pressure sensitive so that it can close either port 46 and 48 depending upon which port has the higher pressure entering it. Preference valve assembly 40 is constructed in a manner similar to that of preference valve assembly 38, having a housing 54 provided with a chamber 56 to which is connected inlet ports 58 and 60 and outlet port 62. Ball check 64 is contained in chamber 56 and operates in a similar manner to ball check 52. Conduit 36 is connected to port 50 of valve assembly 38. A conduit 66 connects the transmission governor pressure to port 46, a conduit 68 connects the transmission forward drive pressure to port 58, and conduit 70 connects transmission reverse pressure to port 60. Conduit 72 connects port 62 of valve assembly 40 to port 48 of valve assembly 38.

Figure 2:
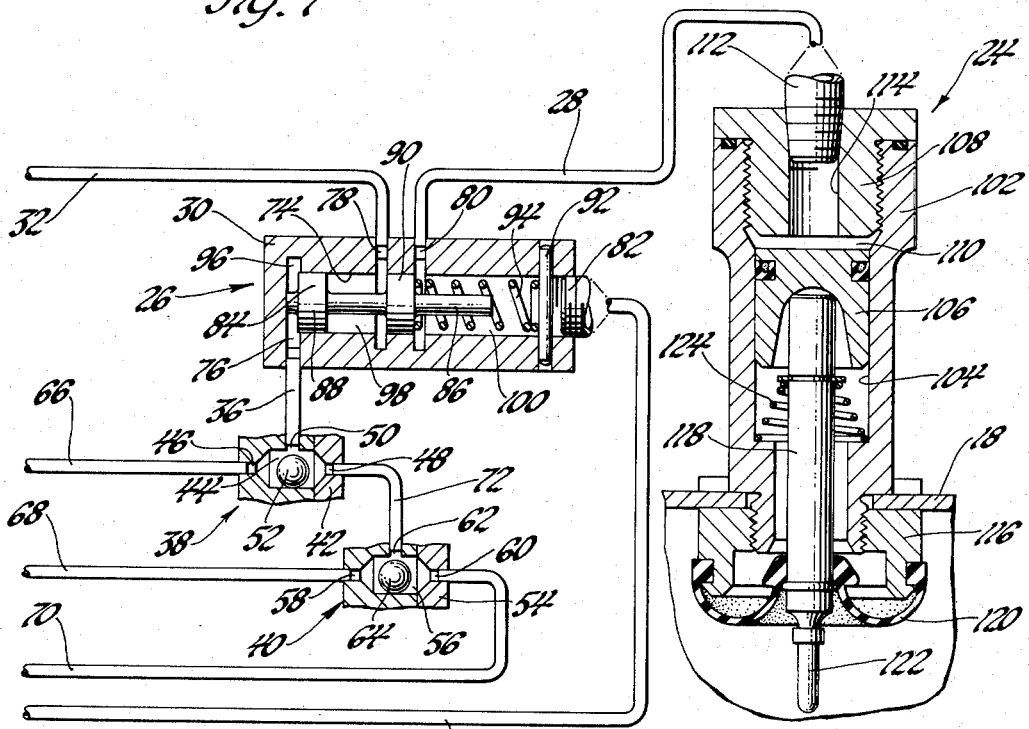
FIG. 2 is an enlargement of certain elements in the mechanism of FIG. 1, with parts broken away and in section, and schematically illustrating portions of the hydraulic circuitry.

The valve assembly housing 30 is provided with a bore 74 which has inlet ports 76 and 78 and outlet ports 80 and 82 connected thereto. A spool valve 84 is reciprocably received in bore 74. Valve 84 has a valve stem 86 with land 88 formed thereon adjacent to but spaced from one end and land 90 formed in spaced relation to land 88. A cross pin 92 extending through the end of bore 74 adjacent port 82 provides a seat for valve spring 94 so that the valve is urged leftwardly as seen in FIGURE 2. Transmission line pressure conduit 32 is connected to the inlet port 78 while preference valve conduit 36 is connected to inlet port 76. The hydraulic release servo pressure conduit 28 is connected to outlet port 80 of the valve assembly 26, and the exhaust or return line conduit 34 is connected to the exhaust port 82 of the valve assembly 26.

With the valve 84 in the position shown, the left end of the valve stem 86 holds land 88 in spaced relation from the bore end so that a chamber 96 is formed in the bore end and is connected to port 76. The chamber 98 between lands 88 and 90 is connected to inlet port 78 but is not connected to any of the other ports. The valve spring and exhaust port chamber 100 is connected to port 80 when the valve is in this position. This is the valve position normally assumed when the transmission is not producing sufficient pressure to overcome the strength of valve spring 94 to move the valve to the right. It can therefore be seen that conduit 28 is connected to exhaust conduit 34 so that there is no pressure in the release servo 24.

The release servo 24 has a housing 102 provided with a bore 104 in which is reciprocably mounted the servo piston 106. The end of the release servo to which conduit 28 is connected is provided with a plug 108 which forms a pressure chamber 110 with a portion of housing 102 and the end of piston 106. The connector 112 connects conduit 28 with pressure chamber 110 through the bore 114 of plug 108. The housing 102 is suitably mounted to the mounting bracket 18, as by the nut and thread arrangement 116. The piston 106 is provided with a push rod 118 extending through the other end of bore 104 from plug 108 and through the nut 116. A suitable boot or seal 120 seals the lower end of bore 104. The push rod 118 has an end 122 which suitably engages the vehicle parking brake mechanism 12 when the piston 106 is moved downwardly as seen in FIG. 2 under influence of pressure in chamber 110 so as to release the parking brake mechanism. Piston rod return spring 124 acts to hold the piston 106 and the push rod upwardly when there is no pressure in chamber 110 so that the parking brake may be applied and held without interference from the release mechanism.

The parking brake release mechanism is shown in the de-energized position in FIG. 2. In this position, the parking brake may or may not be applied. However, if it is applied, it is held in position by suitable mechanism well known in the art. In this condition, the vehicle engine may be running and the transmission may be in the neutral or park position. Likewise, the vehicle may be in a park position without the engine and transmission operating. Assuming the parking brake mechanism 12 to be engaged so that the parking brakes are applied in brakes 14 and 16, and it is desirable to release the parking brake mechanism in order to drive the vehicle, the following sequence of events takes place. The vehicle operator will shift the transmission control lever to the forward drive position or to the reverse drive position. Assuming that the operator intends to drive forwardly, the automatic transmission 10 will generate a forward drive pressure which is transmitted through conduit 68 to preference valve assembly 40. Since there will be no reverse pressure generated in this condition of operation, the ball check 64 will move to the right and close port 60. The forward drive transmission pressure will then be transmitted through port 62 and conduit 72 to the inlet port 48 of the preference valve 38. Since the vehicle is not moving forwardly at this time sufficiently to generate a governor pressure, there will be no governor pressure in conduit 66 and, therefore, the ball check 52 will be moved leftwardly to close port 46 of valve assembly 38. Therefore, the drive pressure will then be transmitted through port 50 and conduit 36 to the inlet port 76 of the valve assembly 26. When this pressure reaches a predetermined minimum amount, sufficient to overcome the force of valve spring 94, valve 84 will move to the right. Land 90 will first close port 80 and will then, upon continued valve movement, reopen port 80 so that it is connected hydraulically to inlet port 78 through the chamber formed between lands 88 and 90. Since the automatic transmission is operating and generating transmission line pressure, that pressure is transmitted from the transmission through conduit 32 and ports 78 and 80 to conduit 28. The actuating pressure is then delivered to pressure chamber 110 of the release servo 24 and piston 106 is moved downwardly. This moves push rod 118 downwardly and causes the parking brake mechanism to be released.

It can be readily seen that if the driver first moved the vehicle in reverse, the reverse pressure generated by the automatic transmission 10 would be transmitted through conduit 70 and inlet port 60 of valve assembly 40, and thence through outlet port 62 and conduit 72 to valve assembly 38. It would then pass through outlet port 50 and conduit 36 to actuate the valve 84 in the same manner. If for any reason the vehicle should be shifted to a neutral or park position while the vehicle is traveling at a sufficient speed to provide enough governor pressure to overcome valve spring 94, drive pressure in conduit 68 and reverse pressure in conduit 70 would not exist. However, the governor pressure would enter valve assembly 38 through port 46, move the ball check 52 to the right to close port 48, and be transmitted through port 50 and conduit 36 to the valve chamber 96 to actuate valve 84 with the same results as described above. This would therefore insure that the parking brake could be applied but could not be locked in the park position while the vehicle is traveling above a predetermined minimum speed sufficient to generate the necessary governor pressure for this action to take place.

If the vehicle is stopped and the parking brake is applied, it will be locked in the applied position only if there is no drive or reverse or governor pressure, delivered to the preference valve means constituting valve assemblies 38 and 40, which is sufficient when delivered to valve assembly 26, to shift the valve 84 to the right so as to connect transmission line pressure to the hydraulic release servo. Therefore, the operator must put the transmission control in the neutral or park position before he can lock the parking brake.

The mechanism disclosed and described provides for hydraulic release of a vehicle parking brake mechanism by use of a vehicle operational mode pressure which is commensurate with one of the operational modes in which it is desired not to have the parking brake locked in position. When it is desired to be able to lock the parking brake in position, there is no pressure delivered to the release servo and the release servo is exhausted of pressure so that it will not release the parking brake mechanism. By the use of preference valve means the highest transmission operational mode pressure is available to operate the release servo, thereby assuring operation thereof at any time that the transmission is in an operational mode in which the parking brakes should not be locked.

What is claimed is:

1. A vehicle parking brake release mechanism comprising:
   a hydraulic pressure actuated parking brake release servo,
   a valve assembly having a hydraulic line pressure inlet first port and a release servo pressure outlet second port and a valve control pressure inlet third port and an exhaust pressure outlet fourth port,
   a valve in said valve assembly having the first position fluidly connecting said second and fourth ports and blocking fluid connection of said first port to any of the other ports,
   a second position assumed in response to a predetermined minimum hydraulic pressure delivered to said third port to fluidly disconnect said second and fourth ports and fluidly connect said first and second ports to deliver hydraulic line pressure to said release servo,
   a vehicle transmission selectively generating a plurality of hydraulic pressures representing different transmission driving modes and vehicle movement, said transmission also providing a source of hydraulic line pressure, preference valve means fluidly connected with said vehicle transmission and said valve assembly third port to receive said plurality of generated transmission hydraulic pressures and, when at least one of said plurality of transmission hydraulic pressures is received, to deliver the highest of said hydraulic pressures to said valve assembly third port as a valve control pressure moving said valve from said first position to said second position, and means moving said valve from said second position to said first position when none of said plurality of selectively generated hydraulic pressures are being generated by said transmission.

2. A vehicle parking brake release for a vehicle having a parking brake and an automatic transmission providing hydraulic line pressure, hydraulic governor pressure, and a hydraulic pressure for each of the vehicle forward and reverse movement modes, said release comprising:

a hydraulic pressure actuated parking brake release servomotor, first valve means having first and second conduits connected thereto respectively receiving said line pressure and one of said movement mode hydraulic pressures, and other conduits connected thereto, one of which is also connected to said servomotor and another of which is also connected to provide a hydraulic pressure exhaust return line to the transmission, second valve means in said second conduit receiving said hydraulic governor pressure and said hydraulic pressures for the vehicle forward and reverse movement modes and operable to deliver the highest of the pressures so received to said first valve means through said second conduit, said first valve means being operable upon receipt of pressure through said second conduit above a predetermined minimum to interconnect said first conduit and the conduit connected to said servomotor to release the vehicle parking brake, said first valve means being operable when no pressure is received through said second conduit at or above the predetermined minimum pressure to fluidly disconnect first conduit from said servomotor conduit and to fluidly connect said servomotor conduit to said hydraulic exhaust pressure return line to hydraulically de-energize said servomotor.

* * * * *